United States Patent [19]
Webber et al.

[11] 3,841,716
[45] Oct. 15, 1974

[54] LUBRICATED TRACK JOINT

[75] Inventors: Raymond E. Webber, Phoenix, Ariz.; Roger L. Boggs, East Peoria; Robert N. Stedman, Chillicothe, both of Ill.

[73] Assignee: Caterpillar Tractor Co., Peoria, Ill.

[22] Filed: Sept. 20, 1972

[21] Appl. No.: 290,553

[52] U.S. Cl............ 305/11, 305/14, 305/58, 74/257, 308/120
[51] Int. Cl............................ B62d 55/20
[58] Field of Search ...... 305/14, 11, 58, 5 R, 120; 74/257

[56] References Cited
UNITED STATES PATENTS
1,289,408  12/1918  Davis.................... 305/14
3,058,454  10/1962  Goncalves............. 308/5 R X
3,178,239  4/1965   Zeller..................... 305/14

FOREIGN PATENTS OR APPLICATIONS
19,960  8/1910  Great Britain............ 74/257

*Primary Examiner*—Richard J. Johnson
*Attorney, Agent, or Firm*—Phillips, Moore, Weissenberger Lempio & Strabala

[57] ABSTRACT

An endless track assembly comprises links pivotally interconnected by pin and bushing assemblies. Each pin is knurled to form a plurality of intersecting grooves thereon to communicate lubricant between the pin and bushing.

1 Claim, 3 Drawing Figures

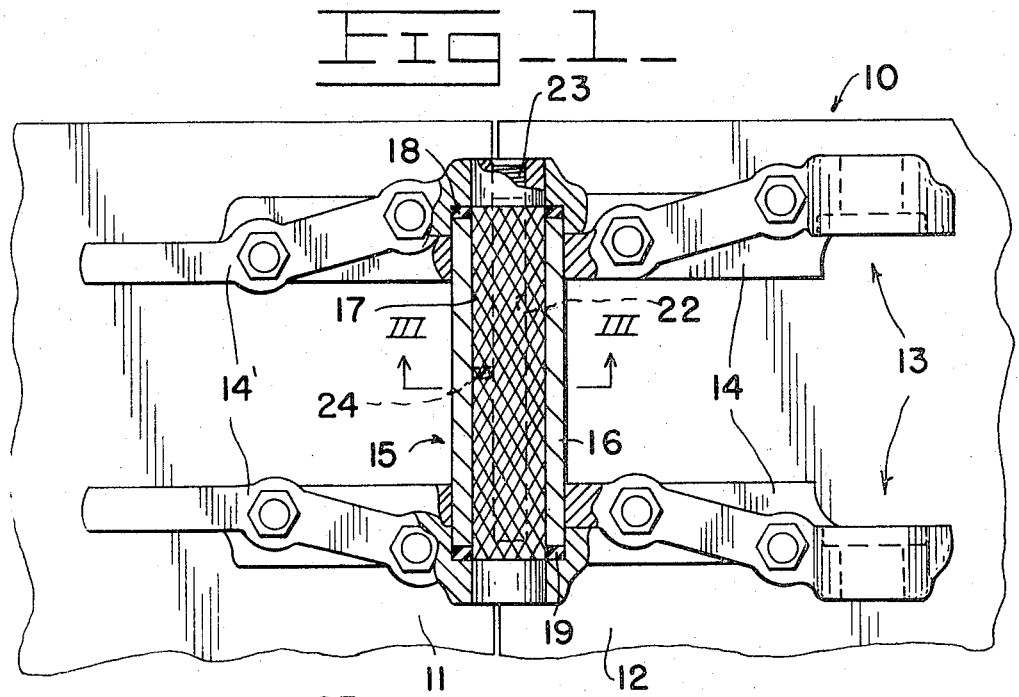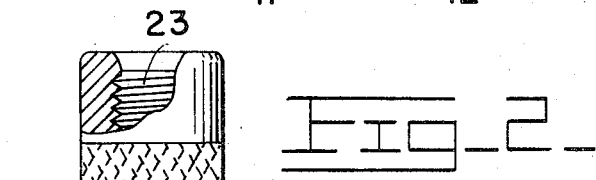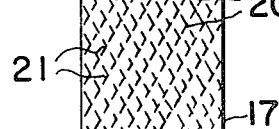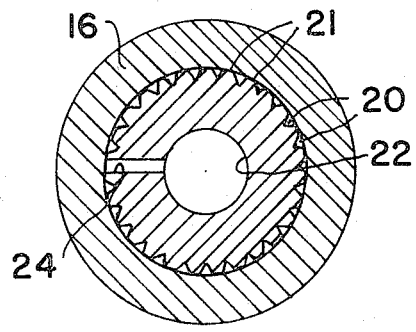

LUBRICATED TRACK JOINT

BACKGROUND OF THE INVENTION

Endless track assemblies for earthworking vehicles, such as the one disclosed in U.S. Pat. No. 3,601,212, assigned to the assignee of this application, comprise a pin and bushing assembly for pivotally interconnecting each pair of adjacent track shoes. Such track assemblies are subjected to severe operating conditions which tend to score or otherwise damage the pin. Prior art methods for continuously and fully lubricating such a pin and bushing assembly normally fail to also provide a substantial area of bearing contact therein. Conversely, when such bearing contact is provided, lubrication is less than satisfactory.

SUMMARY OF THIS INVENTION

An object of this invention is to overcome the above, briefly described problem by providing an efficient lubrication system for the pivot pin and bushing assemblies of an endless track assembly while yet providing a substantial and uniform bearing surface contact between each pin and bushing. The bearing surfaces are uniformly spaced and circumferentially disposed to form a plurality of lubricant retaining grooves therebetween. In the preferred embodiment, a passage means is formed longitudinally in the pin to continuously communicate lubricant to such grooves and the bearing surfaces and grooves are formed by knurling.

BRIEF DESCRIPTION OF THE DRAWING

Other objects of this invention will become apparent from the following description and accompanying drawings wherein:

FIG. 1 is a partially sectioned, top plan view of a portion of an articulated track assembly;

FIG. 2 is an enlarged, top plan view of a knurled pin employed in the FIG. 1 track assembly; and FIG. 3 is a cross sectional view, taken in the direction of arrows III—III in FIG. 1.

DETAILED DESCRIPTION

FIG. 1 illustrates a portion of a track assembly 10 comprising ground engaging track shoes 11 and 12 pivotally interconnected by a link assembly 13. Such link assembly, fully described in above referenced U.S. Pat. No. 3,601,212, essentially comprises identical first and second pairs of links 14 and 14' pivotally interconnected by a pivot means 15. The pivot means comprises a cylindrical bearing bushing 16 having its ends press-fitted into first pair of links 14 and a tubular pin 17 having its ends press-fitted into second pair of links 14'. Annular sealing means 18 and 19 are preferably disposed between the ends of the bushing and links 14' to prevent the egress of lubricant thereby.

Referring to FIGS. 2 and 3, pin 17 has a plurality of intersecting lubricant retaining grooves 20 formed thereon between diamond-shaped bearing surfaces or pedestals 21. As more clearly shown in FIG. 3, the circumferentially disposed bearing surfaces provide a substantial and uniform bearing surface contact between the pin and bushing during flexing of the track assembly. The bearing surfaces and intermediate grooves may be formed by standard knurling and grinding operations or by a broaching operation, for example.

As shown in FIGS. 1 and 2, the pin has a longitudinally extending passage means 22 formed therein adapted to be charged with lubricant and closed by threaded plug 23. One or more radially disposed ports 24 may be formed in the pin to communicate lubricant from passage 22 to the two sets of intersecting grooves 20. The lubricant may comprise a suitable grease or lubricating oil which will readily flow uniformly about the pin upon track assembly operation.

In the illustrated knurled pin embodiment, each of the two sets of grooves are formed in spiralled, parallel relationship to number from eight to 32 per linear inch and preferably approximately about 16 grooves per linear inch. The grooves preferably have a depth approximating ten thousandths of an inch to uniformly and continuously distribute lubricant fully along the pin. Any particles of metal or like contaminants will be trapped in the grooves to prevent scoring of the bushing.

The apexes of diamond-shaped pedestals 21 tend to deform slightly in operation to provide substantial and uniform bearing contact with the inner surface portions of surrounding bushing 16. In cushion track applications, such as those disclosed in U.S. Pat. No. 3,601,212 wherein loads of 10,000 pounds or greater are incurred, a lubricated pin assembly of this invention has been run successfully for 100 hours without noticeable scoring.

It should be understood that grooves 20 could be formed interiorly on bearing bushing 16 rather than on the periphery of pin 17. Also, such grooves could take other shapes such as longitudinally extending grooves intersected at right angles by circumferentially disposed grooves. However, the illustrated embodiment is preferred for most applications for reasons stated above, including ease of manufacture. To obtain maximum quality and performance, a pin of approximate finished size is knurled to a depth that will assure satisfactory volumetric capacity for lubricant in an assembled state. The knurling by displacing material outwardly results in irregular radial protrusions that are best removed by grinding. This consequently, affords an optimum surface to groove ratio because each pedestal becomes a relatively broad and effective bearing.

What is claimed is:

1. An endless track assembly comprising a plurality of ground engaging track shoes, and an articulated link assembly connecting said shoes together comprising a plurality of links, pivot means pivotally interconnecting each pair of adjacent links together, including a cylindrical bushing, a tubular pin having a substantially constant outside diameter throughout its entire length and pivotally mounted within said bushing, said links comprising a first pair of links secured to respective ends of said bushing and a second pair of links secured to respective ends of said pin; annular sealing means disposed between each end of said bushing and a respective one of said second links and circumferentially contacting said pin, means forming a plurality of uniformly spaced and circumferentially disposed bearing surfaces between said bushing and said pin forming a plurality of lubricant retaining and dispersing grooves therebetween; said bearing surfaces each constituting a diamond-shaped knurl formed on said pin, two sets of said grooves formed between said knurls with the grooves of each set formed in spiralled, parallel relationship; said knurls and grooves being uniformly formed substantially along the entire axial length of said pin and terminating short of the ends thereof; with said grooves numbering from eight to 32 per linear inch, and lubricant retaining passage means formed in said pin and port means also formed in said pin for communicating lubricant from said passage means to said grooves.

* * * * *